United States Patent
Krishnamurthy et al.

(10) Patent No.: US 12,286,009 B2
(45) Date of Patent: *Apr. 29, 2025

(54) VEHICLE FUEL LEVEL ESTIMATION

(71) Applicant: Nissan North America, Inc., Franklin, TN (US)

(72) Inventors: Vikram Krishnamurthy, Marietta, GA (US); Timothy O'Donnell, Franklin, TN (US); Lawrence Rosinski, Brentwood, TN (US)

(73) Assignee: Nissan North America, Inc., Franklin, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/380,853

(22) Filed: Oct. 17, 2023

(65) Prior Publication Data

US 2024/0059141 A1   Feb. 22, 2024

Related U.S. Application Data

(63) Continuation of application No. 17/362,014, filed on Jun. 29, 2021, now Pat. No. 11,820,221.

(51) Int. Cl.
*B60K 15/03*      (2006.01)
*G01F 23/36*      (2006.01)

(52) U.S. Cl.
CPC ........... *B60K 15/03* (2013.01); *G01F 23/363* (2013.01); *B60K 2015/0319* (2013.01); *B60K 2015/03217* (2013.01)

(58) Field of Classification Search
CPC ........... B60K 15/03; B60K 2015/0319; B60K 2015/03217; B60K 2015/03197; G01F 23/363; G01F 25/20; G01F 9/006
See application file for complete search history.

(56) References Cited

U.S. PATENT DOCUMENTS

| | | |
|---|---|---|
| 5,379,638 A | 1/1995 | Denz et al. |
| 5,886,625 A | 3/1999 | Uto et al. |
| 7,772,970 B2 | 8/2010 | Masuda et al. |
| 8,733,167 B2 | 5/2014 | Windbergs et al. |
| 8,984,934 B2 | 3/2015 | Sweppy et al. |
| 9,919,664 B2 | 3/2018 | Vucelic et al. |
| 9,970,780 B2 | 5/2018 | Bai et al. |
| 11,512,994 B2 | 11/2022 | Gordon et al. |
| 2004/0204870 A1 | 10/2004 | Schimnowski et al. |
| 2007/0129878 A1 | 6/2007 | Pepper |
| 2009/0056436 A1 | 3/2009 | Miceli et al. |
| 2010/0145638 A1 | 6/2010 | Begin |
| 2014/0260576 A1 | 9/2014 | Sweppy et al. |
| 2017/0369009 A1 | 12/2017 | Vucelic et al. |
| 2018/0299313 A1 | 10/2018 | Rovik |
| 2023/0020594 A1* | 1/2023 | Inoue ................. F02D 41/2451 |

FOREIGN PATENT DOCUMENTS

JP          6045565 B2    12/2016

* cited by examiner

*Primary Examiner* — Xiao En Mo
(74) *Attorney, Agent, or Firm* — Young Basile Hanlon & MacFarlane, P.C.

(57) ABSTRACT

Estimating fuel consumptions of a vehicle is disclosed. A first fuel consumption value in a first time interval is estimated using fuel-sender resistance data. A second fuel consumption value in a second time interval is estimated using fuel-injected mass data. At least the first fuel consumption value and the second fuel consumption value are combined to obtain a fuel consumption value. The fuel consumption value is then output.

20 Claims, 11 Drawing Sheets

200 CONT'D

| Fuel added (L) | Total fuel (L) | Gallons | Resistance (Ω) | Fuel gauge indication (spec) | Actual Indication |
|---|---|---|---|---|---|
| 0.2 | 28 | 7.4 | 187.8 | | 1/2 |
| 1 | 29 | 7.66 | 187.7 | | 1/2+ |
| 1 | 30 | 7.93 | 187.9 | | 1/2+ |
| 1 | 31 | 8.19 | 185.5 | | 1/2+ |
| 1 | 32 | 8.45 | 178.8 | | 1/2+ |
| 1 | 33 | 8.72 | 172 | | 5/8- |
| 0.7 | 33.7 | 8.9 | 168 | 163.2Ω, 5/8 Indication | 5/8- |
| 0.3 | 34 | 8.98 | 163 | | 5/8 |
| 1 | 35 | 9.25 | 160 | | 5/8+ |
| 1 | 36 | 9.51 | 156 | | 5/8+ |
| 1 | 37 | 9.77 | 152 | | 3/4- |
| 1 | 38 | 10.04 | 147.5 | | 3/4- |
| 1 | 39 | 10.3 | 145.5 | | 3/4- |
| 0.6 | 39.6 | 10.46 | 141.5 | 140.2Ω, 3/4 Indication | 3/4 |
| 0.4 | 40 | 10.57 | 141.5 | | 3/4 |
| 1 | 41 | 10.83 | 135.7 | | 3/4+ |
| 1 | 42 | 11.1 | 132.6 | | 3/4+ |
| 1 | 43 | 11.36 | 129.7 | | 13/16 |
| 1 | 44 | 11.62 | 125 | | 7/8- |
| 1 | 45 | 11.89 | 121.4 | | 7/8- |
| 0.6 | 45.6 | 12.05 | 118.5 | 117.2Ω, 7/8 Indication | 7/8 |
| 0.4 | 46 | 12.15 | 118.3 | | 7/8 |
| 1 | 47 | 12.42 | 113.9 | | 7/8 |
| 1 | 48 | 12.68 | 109.3 | | 15/16 |
| 1 | 49 | 12.94 | 105 | | F- |
| 1 | 50 | 13.21 | 100.2 | | F- |
| 1 | 51 | 13.47 | 96.3 | | F |
| 1 | 51.5 | 13.6 | 95.8 | 90.2Ω, F Indication | F |
| 1 | 52 | 13.74 | 91.4 | | F+ |
| 1 | 53 | 14 | 91.5 | | F+ |
| 1 | 54 | 14.27 | 78.6 | | F+ |
| 1 | 55 | 14.53 | 78.4 | | F+ |
| 1 | 56 | 14.79 | 65.1 | | F+ |

VEHICLE FUEL LEVEL ESTIMATION

CROSS REFERENCE TO RELATED APPLICATIONS

This application is a continuation of U.S. patent application Ser. No. 17/362,014, filed Jun. 29, 2021, the entire disclosure of which is incorporated herein by reference.

TECHNICAL FIELD

This disclosure relates to estimating the fuel level in a fuel tank of a vehicle.

BACKGROUND

A vehicle may be equipped with a fuel gauge enabling a driver to obtain a rough idea of the fuel level in the tank of the vehicle. The fuel gauge does not provide an accurate reading of the fuel level in the tank. However, obtaining a more accurate estimate of the fuel level than the estimate provided by the gauge can be desirable in many use cases.

SUMMARY

Disclosed herein are implementations of vehicle fuel level estimation.

A first aspect is a method of estimating a fuel consumption. The method includes receiving a request for estimating the fuel consumption between a first time and a second time; estimating a first fuel consumption value in a first time interval using fuel-sender resistance data; estimating a second fuel consumption value in a second time interval using fuel-injected mass data, where the first time interval and the second time interval are consecutive, non-overlapping intervals; and combining at least the first fuel consumption value and the second fuel consumption value to obtain a fuel consumption value.

A second aspect is a vehicle that includes a fuel tank, a fuel sender, and a processor. The processor is configured to obtain an estimate of a fuel level at a time instant in the fuel tank by steps to record, in history data, fuel-injected mass data and first corresponding timestamps; record, in the history data, fuel sender resistance data and second corresponding timestamps; receive a request to obtain the estimate of the fuel level at the time instant; obtain an instant fuel sender resistance value corresponding to the time instant; in response to the instant fuel sender resistance value indicating that the instant fuel sender resistance value is unreliable to obtain the estimate of the fuel level: obtain, using the history data, a start time of an unreliable region including the instant fuel sender resistance value; obtain, using the history data, a fuel sender resistance value corresponding to the start time of the unreliable region; obtain, using lookup data, a first fuel level corresponding to the fuel sender resistance value; obtain, using the fuel-injected mass data, a second fuel consumed level between the start time and the instant time; and combine the first fuel level and the second fuel consumed level to obtain the estimate of the fuel level; and provide the estimate of the fuel level.

A third aspect is a non-transitory computer-readable storage medium that includes instructions executable by a processor to perform operations including receiving a first request for estimating a fuel consumption between a first time and a second time; estimating a first fuel consumption value in a first time interval using fuel-sender resistance data; estimating a second fuel consumption value in a second time interval using fuel-injected mass data, where the first time interval and the second time interval are consecutive, non-overlapping intervals; combining at least the first fuel consumption value and the second fuel consumption value to obtain a fuel consumption value; and outputting the fuel consumption value.

A fourth aspect is a method for estimating fuel consumptions of a vehicle. The method includes estimating a first fuel consumption value in a first time interval using fuel-sender resistance data; estimating a second fuel consumption value in a second time interval using fuel-injected mass data; combining at least the first fuel consumption value and the second fuel consumption value to obtain a fuel consumption value; and outputting the fuel consumption value.

A fifth aspect is a vehicle that includes a fuel tank, a fuel sender, and a processor. The processor is configured to obtain an estimate of a fuel level at a time instant in the fuel tank by instructions to identify an unreliable instant fuel sender resistance value; determine, using history data, a start time of an unreliable period associated with the unreliable instant fuel sender resistance value; retrieve a reliable fuel sender resistance value from the history data corresponding to the start time of the unreliable period; calculate a first fuel level from the reliable fuel sender resistance value using lookup data; compute a second fuel consumed level from fuel-injected mass data during the unreliable period; and combine the first fuel level with the second fuel consumed level to provide an estimated current fuel level in the fuel tank.

A sixth aspect is a non-transitory computer-readable storage medium that includes instructions executable by a processor to perform operations for estimating fuel consumptions of a vehicle. The operations include estimating a first fuel consumption value in a first time interval using fuel-sender resistance data; estimating a second fuel consumption value in a second time interval using fuel-injected mass data; combining at least the first fuel consumption value and the second fuel consumption value to obtain a fuel consumption value; and outputting the fuel consumption value.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIGS. 2A-2B illustrate is an example of a table that includes benchmark data that can used for vehicle fuel level estimation.

DETAILED DESCRIPTION

In many cases, fuel costs can constitute up to 60% of the operating budgets of fleet operators (e.g., car rental companies, trucking companies, robo-taxi companies, autonomous delivery companies, etc.). Fleet operators may remotely monitor (e.g., interrogate, etc.) vehicles in their fleet(s) for the fuel levels in the vehicles. Current techniques (referred to herein as fuel sender resistance techniques) for obtaining fuel estimates are based on a sender unit resistance technique, which is illustrated in FIG. 1.

However, as further described below, sender resistance techniques are not sufficient to provide an accurate estimate of the fuel level in a fuel tank. Implementations of this disclosure can provide more accurate estimates of fuel levels than those that only use sender resistance techniques. Implementations of this disclosure can use fuel injection data, torque data, other data related to how a driver may drive (e.g., a driving style of) a host vehicle, more data, fewer data, other data, or a combination thereof to supplement the sender resistance technique in cases where the sender resistance technique does not provide accurate fuel level estimates and/or where the sender resistance values cannot be reliably used for estimating the fuel level in a tank. Accurate fuel level estimates obtained according to implementations of this disclosure can at least result in reduced operation costs and more security to drivers.

Figure 1:
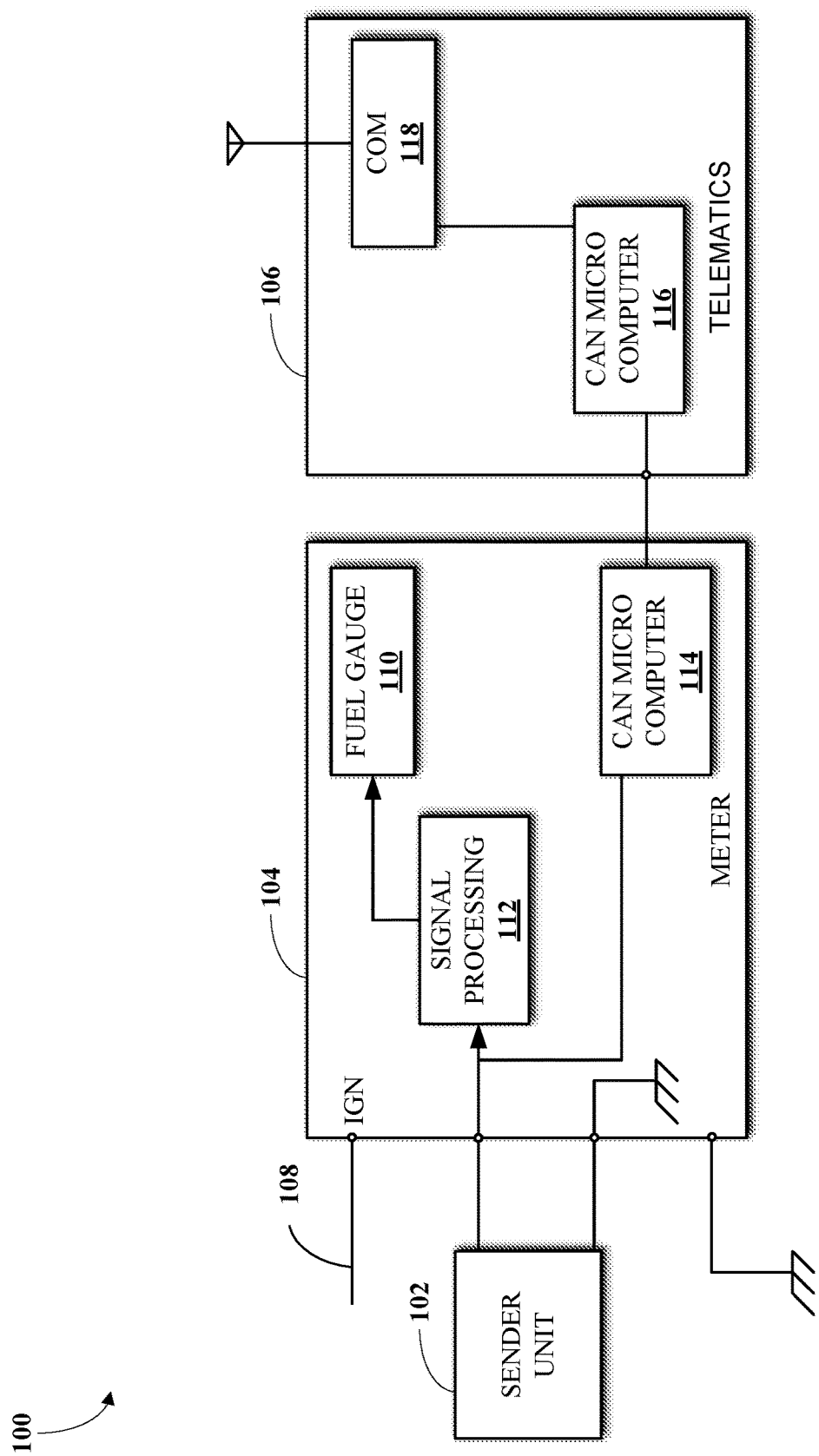
FIG. 1 is a diagram of a system for obtaining an estimate of a fuel level in a vehicle.

FIG. 1 is a diagram of a system 100 for obtaining an estimate of a fuel level in a host vehicle. The system 100 is a conventional system that obtains the estimate of the fuel level using the sender resistance technique. The system 100 includes a sender unit 102 and a processing unit 104. In some implementations, the system 100 can also include a telematics unit 106, which can connect the host vehicle to a remote server, such as a cloud-based platform. The system 100 can be included in a vehicle (not shown). The vehicle can include a plurality of components including but not limited to cellular hardware/software, on-board software, wireless hardware/software (e.g., Bluetooth, WiFi, DSRC, etc.), and a controller access network (CAN) bus providing CAN bus connectivity and supporting the sensor data detection.

The sender unit 102 is placed in a fuel tank (not shown) of the host vehicle. The sender unit 102 can be any unit that is configured for measuring the fuel level. For example, the sender unit 102 can essentially be, or can be thought of as, a float. The sender unit 102 can be used to obtain a signal that operates a fuel level gauge 110 in an instrument cluster of the host vehicle. In an example, the sender unit 102 can include an arm, a float, and a resistor that changes according the position of the float.

The sender unit 102 can be a variable resistor that can resist the flow of current from the ground to the fuel level gauge 110. The resistance values of the sender unit 102 are correlated to the fuel level that is displayed on the fuel level gauge 110. The resistance can depend on the position of the float within the fuel tank. When the fuel level rises (drops), the float also rises (drops), which in turn decreases (increases) the resistance between the fuel level gauge 110 and ground. The more current that flows through the resistor, the higher the indication of the fuel level (e.g., the higher a gauge needle moves) on the fuel level gauge 110.

When an ignition signal 108 is detected, the processing unit 104 may continuously obtain resistance values from the sender unit 102. A signal processor 112 may perform filtering and smoothing of the resistance values, which can be converted, such as by the fuel level gauge 110 and provided, such as via a display, to a driver as a tank level display.

In an example, the processing unit 104 may provide the resistance values to the telematics unit 106. A CAN microprocessor 114 of the processing unit 104 may be configured to transmit the resistance values to a CAN microprocessor 116 of the telematics unit 106. The telematics unit 106 can transmit, via a network interface 118, the resistance values to the remote server. The remote server (e.g., applications or modules therein) may collect fuel usage information from vehicle to provide, for example, fleet management services.

The telematic unit 106 can include a plurality of hardware components, software modules that include a plurality of software applications, and input/output (I/O) components, including the network interface 118. The telematic unit 106 can be embedded or can be part of the host vehicle or can be coupled to or installed into the host vehicle. The telematic unit 106 can be connected to other vehicle sub-systems (e.g., other sub-systems of the host vehicle) through a CAN bus. The plurality of hardware components can include a system-on-a-chip (SoC) (e.g., a Linux SoC, single board computers, computer on modules), the CAN bus (i.e., a CAN transceiver), a Bluetooth transceiver (or other wireless communication transceiver), a GPS sensor, a TCU (Telematics Control Unit), other components, or a combination thereof. The plurality of hardware components can facilitate communications between the host vehicle that includes the telematic control unit (TCU) 106 and the remote server. The software modules can include an application and an operating system (e.g., ResinOS). The I/O components can include a cable to OBD2 port, an external GPS antenna, and wireless components (e.g., Bluetooth, LTE).

The fleet operators require accurate fuel level information to optimize the fleet utilization and reduce fuel costs. For example, accurate fuel level information can be used to optimize routes (e.g., trucking routes). However, simply reading the fuel level on a meter (i.e., the fuel gauge), as described with respect to FIG. 1, may not be accurate for all cases because the fuel sender resistance techniques, described with respect to FIG. 1, may not provide accurate fuel level information for all cases.

The fuel sender resistance techniques described with respect to FIG. 1 can result in inaccurate fuel level estimation in situations where a fuel tank is filled beyond the Full level indicator on the meter, where the fuel level is close to or is at the Empty level indicator on the meter, and, depending on the shape of the fuel tank (e.g., a saddle fuel tank), where the fuel level is near the half full level indicator.

To illustrate, a rental car service person may fill a fuel tank beyond the Full indicator; a customer may drive the rental car for a few miles before returning the rental car such that the fuel indicator still indicates Full. As such, a customer has driven the car without paying for the consumed fuel resulting in a loss to the rental car company. As another example, an available autonomous delivery vehicle may not be sent on a short-distance delivery route because the meter indicates Empty therewith delaying delivery and resulting in lower quality of service to a customer. However, the autonomous delivery vehicle includes in fact sufficient fuel to complete the short-distance delivery.

Figure 2A:
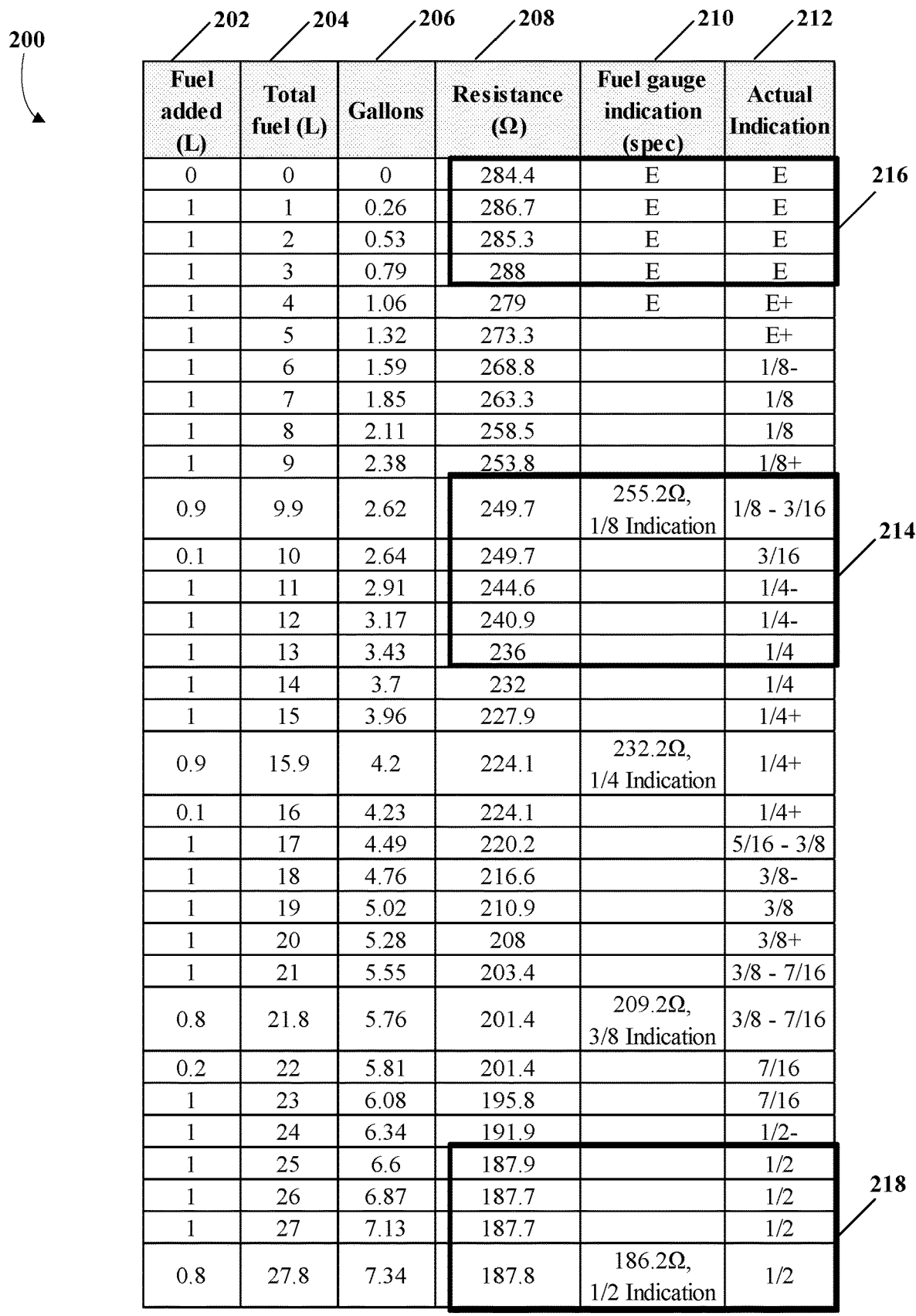

FIGS. 2A-2B illustrate an example of a table 200 that includes benchmark data that can used for vehicle fuel level estimation. FIG. 2B includes a continuation of the table 200. The benchmark data of the table 200 are obtained using a liter-by-liter fuel fill test of a vehicle of a particular make and model. Before the benchmark data of the table 200 are obtained, the fuel tank of the vehicle is ensured to be empty. For example, the vehicle is driven to a gas station and stalled (such as by revving the engine) at the gas station. After the tank is empty, fuel is added to the tank one liter at a time, from zero to 56 liters. The sender resistance is measures after every liter of fuel is added.

A column 202 includes the amount of fuel (in liters) added at a time. A column 204 shows the cumulative (e.g., running total) of the fuel (in liters) in the tank. A column 206 shows the cumulative (e.g., running total) of the fuel (in gallons) in the tank. A column 208 shows the measured sender resistances corresponding to total fuel levels in the tank. A column 210 indicates what the meter should indicate given the total fuel amount in the fuel tank, according to a specification of manufacturer of the vehicle. A column 212 illustrates the meter reading (such as on display of the vehicle) for the corresponding total fuel amount.

In areas (such as an area 214) other than areas 216, 218, and 220, the relationship between the total fuel (in liters) of the column 202 and the resistance (in ohms) of the column 208 is roughly linear. For example, for every one liter added, the sender resistance drops by roughly five ohms. While the relationship is not exactly linear, for ease of reference, the relationship is referred to herein as linear. Contrastingly, in the area 216, the resistance is roughly flat. Similarly, in the area 218, when the fuel tank includes any fuel level between 25 and 31 liters, the sender resistance is almost the same (e.g., roughly, 187.7, 187.8, or 187.9 ohms). As such, as fuel is added to the fuel tank, the sender resistance does not change as it changes in the area 214. The roughly flat resistance in the area 218 can be due to the shape of the tank (e.g., a saddle tank). In the area 220, when the meter indicates that the tank is fuel, as more fuel is added the resistance fluctuates between rapid drops and being flat.

As such, and further described, the fuel sender resistance value in certain ranges can be a reliable indicator of the fuel level in the tank; while in other ranges the fuel sender resistance value is an unreliable indicator of the fuel level in the tank.

Figure 3:
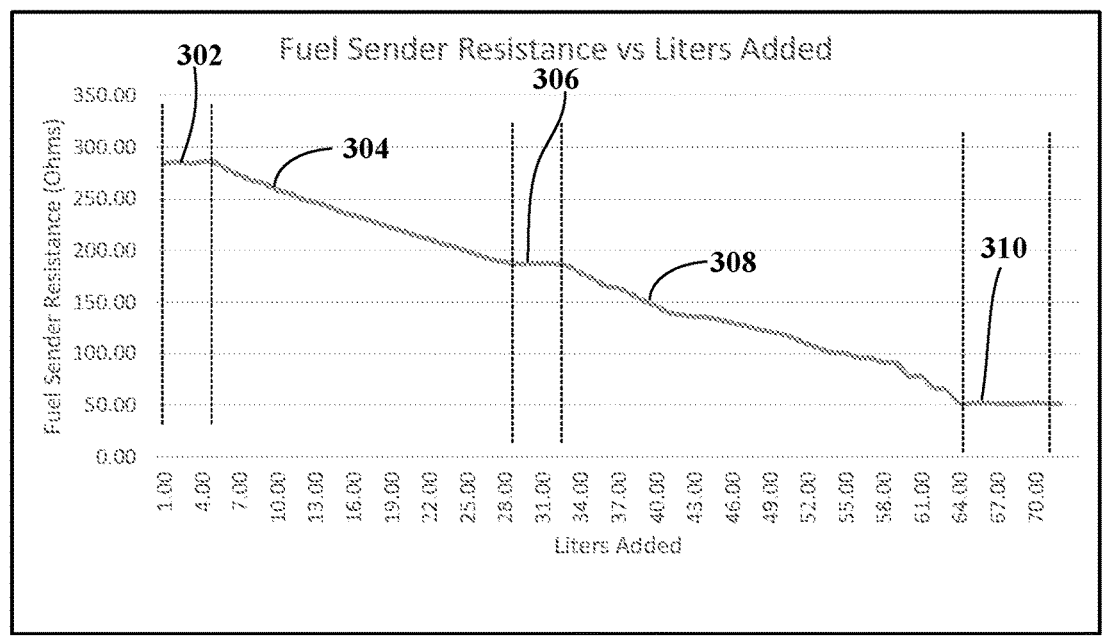
FIG. 3 is an example of a plot a fuel sender resistance vs. liters added.

FIG. 3 is an example of a plot 300 a fuel sender resistance vs. liters added. The plot 300 plots measured resistances of a fuel sender (e.g., the data, or data similar to, the data of the column 208 of FIG. 2) against the cumulative number of liters of fuel added (e.g., the data, or data similar to, the data of the column 204 of FIG. 2).

The plot 300 includes five distinct regions: regions 302-310. As mentioned above, the regions 304 and 308 are referred to as linear regions to indicate a quasi-linear relationship between the fuel sender resistance and the number of liters of fuel in the tank; and the regions 302, 306, and 310 are referred to as flat regions (or quasi-flat regions) to indicate that, as fuel is added, the fuel sender resistance remains roughly constant or at least does not change at a same or similar rate as in the regions 304, 308. It has been observed that each flat region accounts for (e.g., amounts to, etc.) approximately 3 liters of fuel. While, for ease of reference, the term flat region is used, the term flat region should be understood to mean a range of fuel sender resistance values such that a fuel sender resistance value in the range does not provide a reliable or accurate estimation of the fuel level in the fuel tank. As such, a flat region is also referred to herein as an unreliable region. A fuel sender resistance value that is in a linear region can be used reliably to obtain an estimate of the fuel level. As such, a linear region is also referred to herein as a reliable region.

The regions 302, 306, and 310 illustrate the cases where the fuel sender resistance technique is not accurate for fuel level estimation. The region 302 illustrates that when the tank (i.e., the meter or fuel gauge) indicates that the tank is empty (e.g., includes 1-4 liters of fuel), the fuel sender resistance value is flat. The region 306 illustrates that when the tank (i.e., the meter or fuel gauge) indicates that the tank is half empty (e.g., includes 28-34 liters), the fuel sender resistance value is flat, which may be due to the shape of the fuel tank (e.g., a saddle shape of the fuel tank). The region 310 illustrates that when the tank (i.e., the meter or fuel gauge) indicates that the tank is full (e.g., incudes more than 64 liters), the fuel sender resistance value is flat. In some situations, when the tank is full, the fuel sender resistance value may be rapidly changing such that the fuel sender resistance value is unreliable for estimating the fuel level in the tank.

In the regions 302, 306, 310, the fuel sender resistance is unreliable for obtaining the fuel level, CAN bus parameters (e.g., signals) or other vehicle data can be used to supplement fuel sender resistance. In an example, a measure of fuel consumption, instead of the measured fuel sender resistance, can be used in the regions where the fuel sender resistance is unreliable for obtaining the fuel level. In an example, a CAN parameter that can be the measure of fuel consumed can be a signal relating to the total input fuel mass injected by fuel injector of a fuel injection system. The total input fuel mass signal, or simply Total Input Mass signal, is referred to herein as the TIM parameter, TIM value, or simply TIM. As is known, the fuel injection system of a vehicle can provide the right amount of fuel under different engine operating conditions, which can result in a precise air-fuel-ratio control allowing for easy engine operation under different conditions, such as at low engine temperatures (i.e., a cold start), different altitudes and ambient temperatures, different engine speeds (e.g., idle and redline speeds), and the like.

Figure 4:
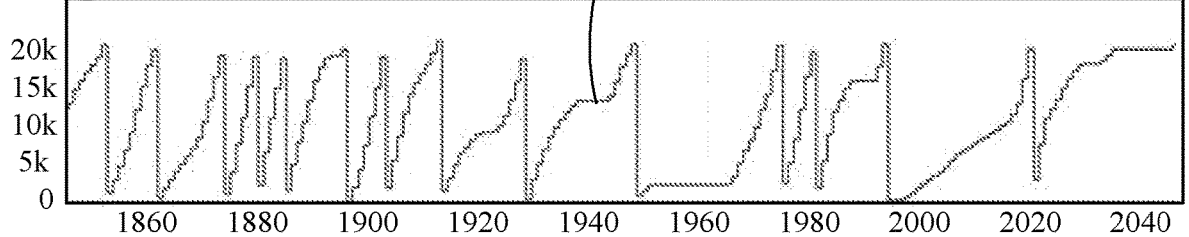
FIG. 4 is an example of a plot of a total input mass parameter over time.

FIG. 4 is an example of a plot 400 of a total input mass parameter over time. The x-axis represents time in milliseconds and the y-axis represents values of the TIM parameter in cubic millimeters.

The TIM signal may be periodically sampled by the CAN bus and made available to one more electronic control units (ECUs) of the host vehicle. The CAN bus may receive (e.g., retrieve, poll, query, read, collect, etc.) data, including the TIM parameter, from an engine control unit (ECU) at a certain frequency. In an example, the CAN bus may receive the TIM parameters every 10, 20, or other number of milliseconds. The CAN bus may broadcast parameters, including the TIM parameter. One or more ECUs may read the TIM signal from/off the CAN bus.

A curve 402 plots values of the TIM parameter as sampled (and/or broadcast) by the CAN bus. The curve 402 is merely an illustration. Curves of TIM parameter values can change depending on, for example, speed, acceleration, ambient or engine temperature, and the like. To obtain an estimate of the fuel consumed in a period of time, the TIM signal can integrated over the period of time to obtain the volume of fuel in cubic millimeters. The area under the curve between two points (i.e., the period of time) can provide the estimate of the fuel consumed in the period of time between the two time points.

In some vehicle configurations, the TIM parameter may be set by the fuel injection system at a first frequency that is different from a second frequency at which the CAN bus broadcasts the TIM parameter. For example, the fuel injection system may update the TIM parameter every four milliseconds and the CAN bus may broadcast the TIM parameter every 20 milliseconds. As such, the sampled TIM parameter values may omit (e.g., miss, not include, not sample, etc.) certain TIM parameter values. For example, TIM parameter values that may be due to sudden accelerations may not be sampled because, for example, they occur between sampling times. Similarly, the TIM signals may not be accurate for a cold start. The TIM parameter may need to be calibrated for cold starts due to the ECM not accurately monitoring air flow resulting in a large amount of fuel injected rapidly. The rapid fuel injection may not be accurately accounted for in TIM (such as due to the frequency of obtaining the TIM value, as described herein). To account for fuel consumed in cold starts, respective fuel consumptions of identical trips with some trips including cold starts can be measured. The differences in the fuel consumptions can be attributed to the cold starts and can be used as calibration data. An average amount of fuel consumed during cold starts can be obtained by performing such experiments in a statistically meaningful number of times. As such, in some examples, the sampled TIM parameter values may be calibrated to more accurately reflect the amount of fuel consumed. The sampled TIM parameter values can be calibrated using any number of techniques.

In an example, the sampled TIM parameter values can be calibrated based on a number of sudden accelerations. In an example, CAN bus signals can be used to count a number of sudden accelerations and adjust the TIM signal (or more accurately, the calculated fuel estimate) appropriately, as further described below. In an example, time series data related to revolutions per minute (RPM) of the engine, speed, and similar data can be used to detect and count sudden accelerations.

In an example, the CAN bus signals used to count the number of sudden accelerations can be signals related to torque data. As is known in the art, torque can refer to a force that produces a rotation of, or torsion to, a drive shaft. Torque is correlated to sudden accelerations. In an example, a control signal for torque adjustment, an actual measured torque value, other torque-related signals, or a combination thereof. The torque adjustment control signal can be transmitted to one or more differentials of the host vehicle. Alternatively or additionally, the torque adjustment control signal can be, or can include, a torque value that can be transmitted to the engine of the host vehicle, which can result in an alteration of the amount of torque that is produced by the engine. In an example, the actual measured torque value can be the actual torque value that is produced by the engine or is received by one or more differentials of the host vehicle. There may be a lag between the time that the control signal for torque adjustment is transmitted and the time that the torque is actually adjusted. As such, in some examples, the torque adjustment control signal may be used to determine the number of sudden accelerations.

Calibration information can be derived imperially. For example, data collected from one or more test drives of one or more vehicles of a particular make and model can be analyzed to determine and count the number of peak torque values. The peak torque values can correspond to sudden accelerations. A completely empty tank may be filled using a certain amount of fuel (a fill amount). The test vehicle may be driven until it stalls (i.e., until it is completely empty) or until a fuel sender resistance value that is known to reliably indicate the fuel level is reached. The total amount of the fuel used on the trip can be calculated as described herein but without taking into account calibration data. That is, and referring to FIG. 3 as an example, the total amount of the fuel used can be measured in regions 310, 306, and 302 using the TIM values, and the fuel used in regions 308 and 304 can be obtained (e.g., assumed, calculated, determined, etc.) based on the sender unit resistance.

Discrepancies between the calculated total amount of the fuel used and the fill amount can be attributed to calculations using the TIM values. More specifically, the discrepancies may be due to the discrepancies between the sampling rate (e.g., 10 or 20 ms) of the TIM signal and the change rate (e.g., every 4 ms) of the TIM value itself. An error per acceleration can be obtained. The error per acceleration can be used as a calibration factor, which can be used as an additive value.

To illustrate, on a test drive, the fill amount may be 4 liters, the calculated fuel consumed until the test vehicle stalls may be 3 liters, the number of sudden accelerations may be counted to be 10. As such, a discrepancy of 1 liters over 10 sudden accelerations was observed and the error per acceleration is thus 1/10 of a liter. Errors per accelerations can be obtained using many test drives and different numbers of sudden accelerations per drive. In real time, and as further described below, a host vehicle may receive a request for the amount of fuel consumed during a period of time. The amount of fuel consumed may be calculated to be 30 liters where 20 liters were calculated based on fuel sender resistance values and 10 liters we calculated using TIM values and 3 sudden accelerations may have been counted in that period of time. As such the calibrated amount of fuel consumed can be reported as 30+(3*1/10)=30.3 liters.

In an example, there can be different calibration values for different types of sudden accelerations. The different types of sudden accelerations can be defined, for example, by the length (i.e., time duration) of the torque control signal. For example, a first sudden acceleration type may correspond to a greater than zero to one second of torque control length, a second sudden acceleration type may correspond to a one to three seconds of torque control length; a third sudden acceleration type may correspond to a three to five seconds of torque control length; and so on. The sudden acceleration types can be defined in other ways.

Another calibration value may be obtained for cold start, as described above. A cold start can be defined as the engine or the engine coolant temperature being less than a predetermined cold start temperature. To illustrate, the predetermined cold start temperature may be approximately −20.0° C. Cold starts can result in discrepancies between actual fuel consumed and TIM-based estimation, as described herein, of the fuel consumed. In real time, in response to receiving an ignition start/on signal, the engine (or engine coolant) temperature can be obtained to determine whether a cold start condition is active and set a flag accordingly. As further described below, a host vehicle may receive a request for the amount of fuel consumed during a period of time. The calculated amount of fuel consumed can be calibrated using a cold-start calibration factor in response to the cold start condition having been set to active.

Figure 5:
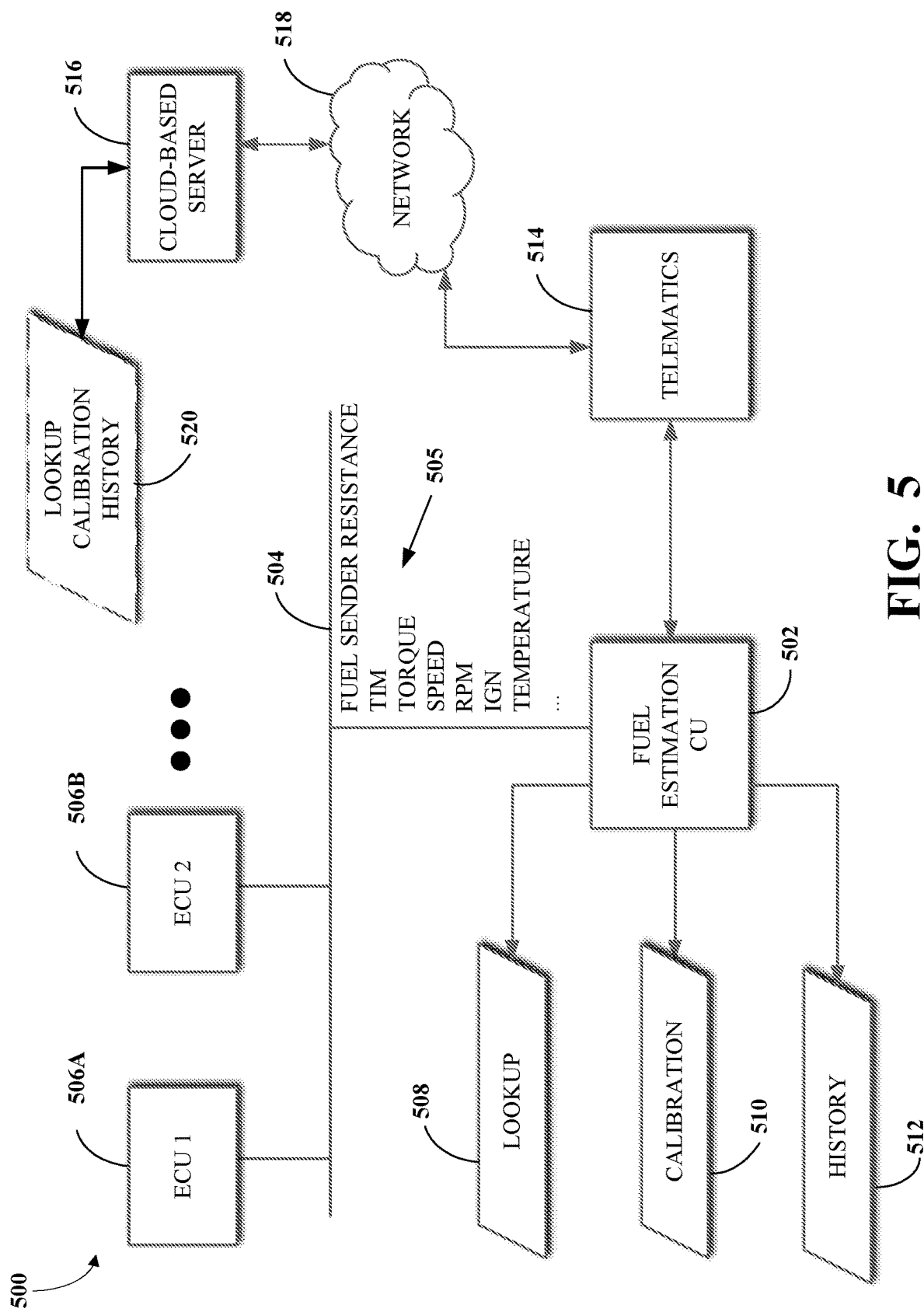
FIG. 5 is an example of a system for accurate fuel level estimation.

FIG. 5 is an example of a system 500 for accurate fuel level estimation. The system 500 includes fuel estimation module 502, which can be available (e.g., installed, operative, deployed, etc.) in a host vehicle. The fuel estimation module 502 corresponds to a device that provides (e.g., outputs, calculates, estimates, etc.) data regarding fuel consumption.

The fuel estimation module 502 can be connected to a CAN bus 504. Other control modules, such as engine control modules (ECUs) 506A, 506B, may also be connected to the CAN bus 504. One or more of the ECUs can be engine or powertrain control modules that can provide signals usable in fuel level estimation. The CAN bus 504 enables each ECU to communicate with all other ECUs. For example, an ECU can broadcast information via the CAN bus. The broadcasted data can be accepted or ignored by one or more other ECUs connected to the CAN bus 504. The fuel estimation module 502 can accept (e.g., read, etc.), from the CAN bus 504, signals usable in fuel level estimation 505. The signals usable in fuel level estimation 505 can include values of fuel sender resistance, the TIM signal, torque control signals, speed, RPM, ignition off, coolant or engine temperature data, more signals, fewer signals, other signals, or a combination thereof.

The fuel estimation module 502 can access lookup data 508 and calibration data 510. In an example, one or more of the lookup data 508 or the calibration data 510 may be stored in a memory that may be a non-transitory, permanent storage. In an example, one or more of the lookup data 508 or the calibration data 510 can be part of algorithmic instructions of the fuel estimation module 502. To illustrate, and without limitations, the calibration data 510 may be implemented as algorithmic rules of the fuel estimation module 502. In an example, the lookup data 508 and the calibration data 510 can be combined into one or more lookup tables. The The lookup data 508 can include or can be benchmark data that the fuel estimation module 502 can use for estimating the amount of fuel consumed. The lookup data 508 can receive (e.g., as input) a fuel sender resistance value (such as described with respect to the column 208 of FIGS. 2A-2B) and provide (e.g., as output) a total fuel amount in the fuel tank (such as described with respect to the column 204 of FIGS. 2A-2B). The lookup data 508 can also receive fuel sender resistance value and provide a determination as to which of the regions 302-310 of FIG. 3 the fuel sender resistance value is indicative of.

The fuel estimation module 502, or some other module, can periodically store, in a history 512, the signals usable in fuel level estimation 505 along with respective timestamps of the times that the values were stored in the history 512 and/or the times that the signals usable in fuel level estimation 505 were obtained from the CAN bus. As such, the history 512 can include time series data that can be used for obtaining the fuel consumption level.

The fuel estimation module 502 can provide data regarding fuel consumption in response to a request, which may be directly received by, or transmitted from another component to, the fuel estimation module 502. In an example, the request may be a request that is received from a telematics unit 514, which can be or can be similar to the telematics unit 106 of FIG. 1. The telematics unit 514 may receive the request from a server, such a cloud-based server 516, via a network 518.

In an example, the request can be a first request for obtaining an amount of fuel consumed by the host vehicle on a given trip (e.g., between a first time instant and a second time instant). Stated simply, the first request asks the question: how much fuel was used on the trip; or the question: how much fuel has been consumed so far by the current trip. In an example, the request can be a second request for obtaining the fuel level in the fuel tank at a time instant (e.g., the time of receiving the request). Stated simply, the second request asks the question: how much fuel is left (or is currently) in the tank.

In an example, the fuel estimation module 502 can receive the request and provide the response, such as by performing processing as described herein. In another example, the fuel estimation module 502 can receive the request and provide data usable by the requester, which in turn can use the data usable by the requester to obtain the response, such as by performing processing as described herein. The requester can include lookup data and calibration data similar to the lookup data 508 and the calibration data 510, respectively.

The data usable by the requester to obtain the response can include data included in the history 512, portions thereof, aggregations thereof, other data, or a combination thereof. In another example, the signals usable in fuel level estimation 505 may be periodically transmitted to the cloud-based server 516. As such, the cloud-based server 516 can determine a response to the request without transmitting the request to the host vehicle. That is, the cloud-based server 516 can include and/or can obtain all data necessary to determine the response to the request, as illustrated by a store 520.

The fuel estimation module 502 can be implemented by using a microcomputer including a CPU (central processing unit), memory, and an input-output unit. A computer program consisting of executable instructions that cause a microcomputer to function as the fuel estimation module 502 can be installed into and executed by the microcomputer. This allows the microcomputer to function as the fuel estimation module 502. Note that although here an example in which the fuel estimation module 502 is implemented by software will be described, as a matter of course the fuel estimation module 502 can be implemented by dedicated hardware prepared for executing each information process or technique described herein.

Figure 6:
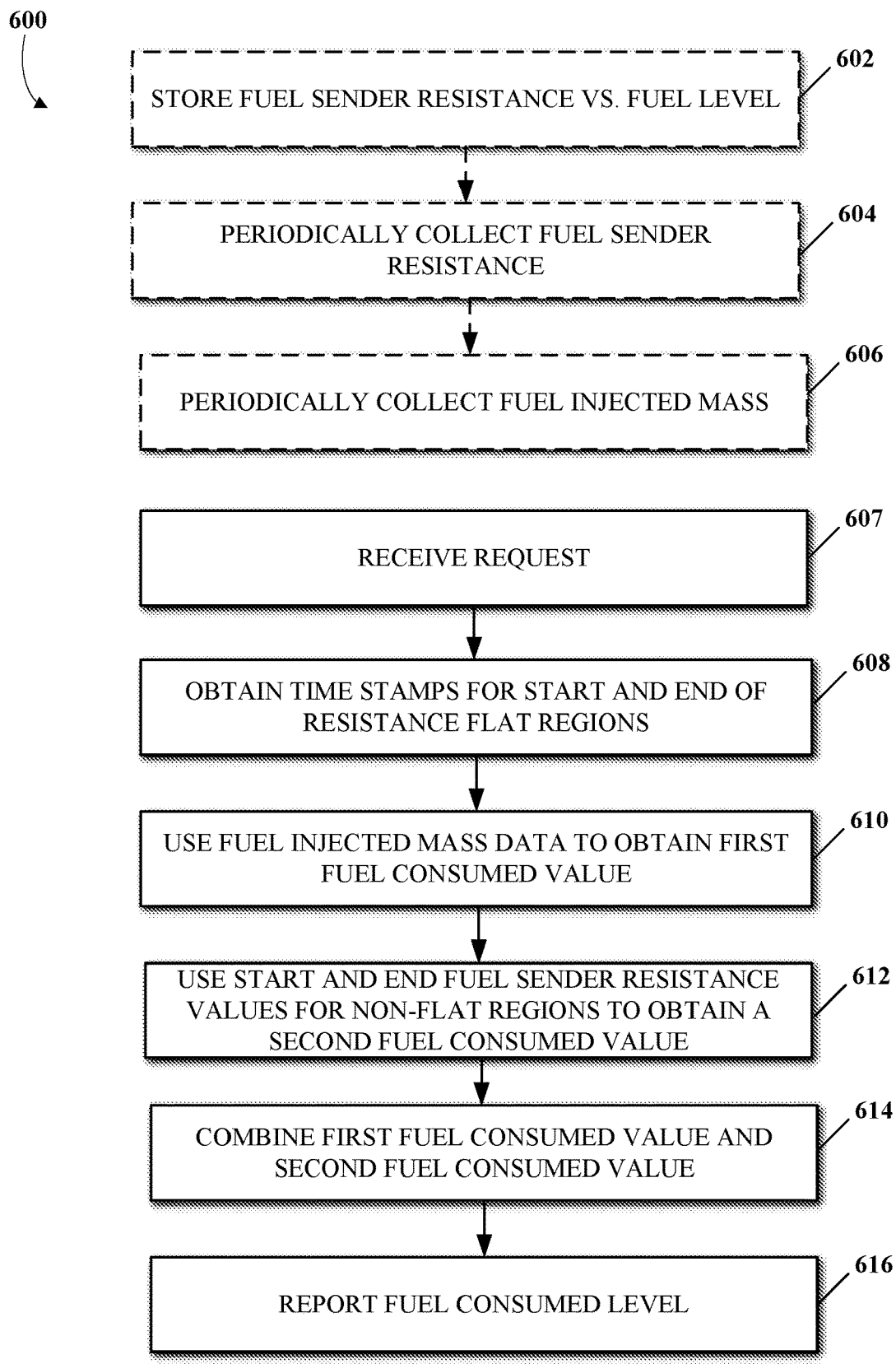
FIG. 6 is a flowchart of an example of a technique for determining an amount of fuel consumed for a trip by a host vehicle.

FIG. 6 is a flowchart of an example of a technique 600 for determining an amount of fuel consumed for a trip by a host vehicle. The technique 600 can be implemented by a fuel estimation module, which can be the fuel estimation module 502 of FIG. 5. The technique 600 can be implemented by a server, such as the cloud-based server 516 of FIG. 5, which is communicatively connected to the host vehicle. The technique 600 can be performed in response to receiving a request for determining the amount of the fuel consumed for the trip by the host vehicle.

At 602, lookup data may be stored such that the lookup data is accessible, directly or indirectly, by a component (e.g., module, program, etc.) executing the technique 600. The lookup data can include fuel sender resistance data versus fuel level data. The lookup data can be as described with respect to the lookup data 508 of FIG. 5. As described above, the lookup data can be obtained empirically and may be available for the host vehicle (e.g., the make and model of the host vehicle). The lookup data may be stored before the request for determining the amount of the fuel consumed for the trip is received.

At 604, the technique 600 can periodically collect fuel sender resistance values. In an example, the fuel sender resistance values can be collected from a CAN bus of the host vehicle, such as the CAN bus 504 of FIG. 5. In an example, the fuel sender resistance values can be stored in a memory of the host vehicle, such as the history 512 of FIG. 5. In an example, the fuel sender resistance values can be transmitted to a server, such as the cloud-based server 516, which stores the fuel sender resistance values in the store 520.

At 606, the technique 600 can periodically collect fuel injected mass values (i.e., TIM values). In an example, the fuel injected mass values can be collected from the CAN bus of the host vehicle. In an example, the fuel injected mass values can be stored in a history that can be a permanent storage. The history can be a history of the host vehicle, such as the history 512 of FIG. 5. In an example, the fuel injected mass values can be transmitted to the server, which can be the cloud-based server 516 of FIG. 5. As such, the fuel sender resistance values can be stored in the history that is or is part of the store 520 of FIG. 5.

The technique 600 can perform the data collection at 604-606 in response to a request to start collecting the data. In an example, the request can be a request to initiate a trip, which in turn can indicate that data collection is to start by the technique 600. In an example, the technique 600 can continuously collect the data from the time that an ignition-on signal is received (e.g., detected, etc.) until an ignition-off signal is received (e.g., detected, etc.). In an example, the technique 600 can collect more or fewer signals usable in fuel level estimation, as described with respect to the signals usable in fuel level estimation 505 of FIG. 5.

At 607, the technique 600 receives a request to determine the amount of fuel consumed. The request can include a start time and an end time. In an example, the start time and the end time can be derived from other information included in the request. Unless the context indicates otherwise, the terms time and timestamps are used interchangeably herein.

The technique 600 can obtain, such as from the history (e.g., the history 512 or the store 520 of FIG. 5), a first sender resistance value corresponding to the start time and a second sender resistance value corresponding to the end time. While not specifically shown in FIG. 6, if the technique 600 determines, such as using lookup data (e.g., the lookup data 508 or the store 520 of FIG. 5), that the first sender resistance value and the second sender resistance value indicate that the fuel level is in a linear region (e.g., one of the regions 304 or 308), then the technique 600 can obtain a first fuel level and a second fuel level corresponding, respectively, to the first sender resistance value and the second sender resistance from the lookup data; subtract the second fuel level from the first fuel to obtain the amount of fuel consumed level. The technique 600 can then proceed to 616 to report (e.g., output, display, return, etc.) the amount of the fuel consumed for the trip.

In the case that at least one of the first sender resistance value or the second sender resistance value does not indicate that the fuel level is in a linear region, then the technique 600 proceeds to 608. That is, the technique 600 proceeds to 608 in the case that at least one of the first sender resistance value or the second sender resistance value is unreliable as an estimate of the fuel in the fuel tank.

At 608, the technique 600 obtains time stamps for the start and end of resistance flat regions (i.e., unreliable regions) from the history.

Figure 7:
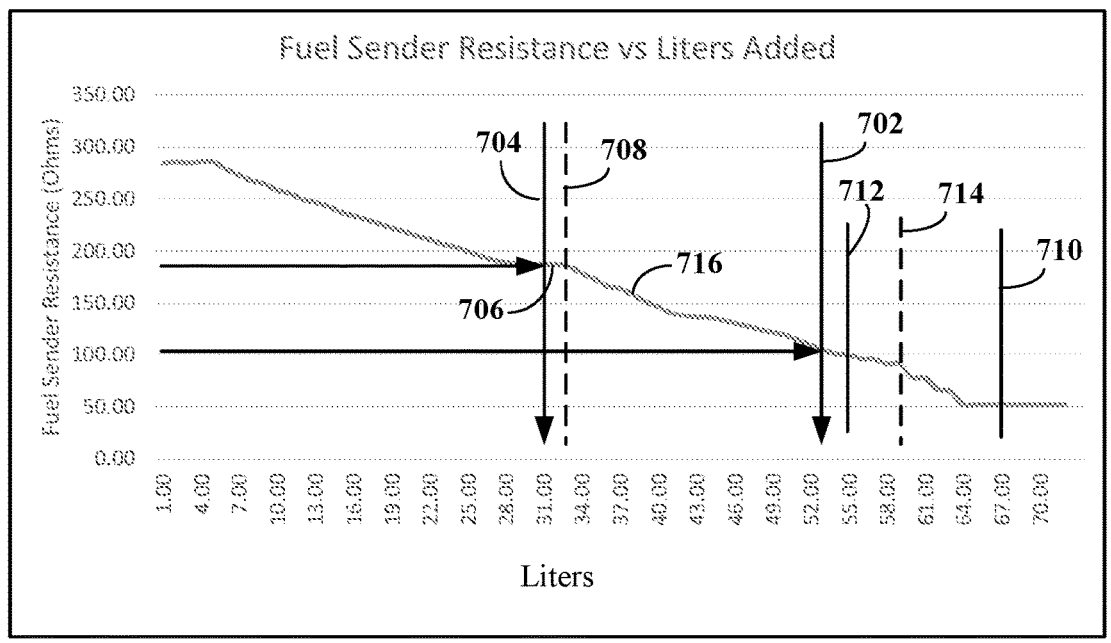
FIG. 7 illustrates an example of determining an amount of fuel consumed for a trip by a host vehicle.

FIG. 7 illustrates an example 700 of determining an amount of fuel consumed for a trip by a host vehicle. In the example 700, the trip start time and end times correspond to a time 702 and a time 704, respectively. More accurately stated, the technique 600 determines that the trip start time, as stored in the history, corresponds to the fuel sender resistance value 100.00 ohms; and that the trip end time, as stored in the history, corresponds to the fuel sender resistance value of approximately 187 ohms.

The technique 600 determines that entry into a flat region 706 started at a time 708. The time 708 can be obtained using fuel sender resistance data in the history. Entry into the flat region 706 can be determined by examining the slope of the fuel resistance curve over time. As is shown in FIGS. 2A-2B, 3, and 7, the slope changes until a flat region is reached, at which point the slope is zero (or approximately zero), or more accurately, flattens. As already eluded to above, where the slope is zero (or near zero) the TIM parameter can be used for fuel estimation.

To determine that the slope is flattening, the first derivative of the fuel sender resistance values with respect to time, which are stored in the history, can be calculated. In some examples, the second derivatives can also be calculated. As is known, the second derivative can be used as an indication of the flatness of the first derivative. In an example, the first derivatives and the second derivatives can be calculated (and stored in the history) at a time of adding entries to the history, as described with respect to 604-606. In another example, the first derivatives and the second derivatives can be computed on demand (e.g., when needed). Similarly, the technique 600 can use the first derivatives and/or the second derivatives to determine exit from a flat region, such as in a case where the trip start time is at a time 710 and the trip end time is a time 712.

At 610, the technique 600 uses fuel injected mass data (i.e., TIM parameter values) to obtain a first fuel consumed value. The technique 600 can use the lookup data, as described above, to obtain the first fuel consumed value. The technique 600 determines a time duration, based on the history data, that the fuel sender resistance remained in the flat region (i.e., the unreliable region) and integrate the TIM parameter values over the time duration to obtain the first fuel consumed value. In an example, the first fuel consumed can be a calibrated value, such as using other signals, as described, for example, with respect to torque-related signals.

At 612, the technique 600 uses the start and end fuel sender resistance values for non-flat regions to obtain a second fuel consumed value. That is, for example, the technique 600 uses the time 702 and the time 708 to determine the fuel consumed in a region 716. In the region 716, the fuel sender resistance values can be used reliably for fuel level (or fuel consumption) estimation. Using the history data, the technique 600 determines that the time 702 corresponds to a sender resistance value of 100 ohms, which in turn corresponds to 53 liters of fuel in the tank; and that the time 708 corresponds to a sender resistance value of 178.8 ohms, which in turn corresponds to 32 liters of fuel in the tank. As such, the second fuel consumed value can be calculated as 53−32=21 liters of fuel consumed.

At 614, the technique 600 combines (e.g., sums) the first fuel consumed value and the second fuel consumed value to obtain the amount of the fuel consumed for the trip. At 616, the technique 600 reports (e.g., provides to the requester) the amount of the fuel consumed for the trip. In an example, the amount of the fuel consumed may be reported to a fleet manager. In an example, the amount of the fuel consumed may be displayed to the driver of the host vehicle.

Figure 8A:
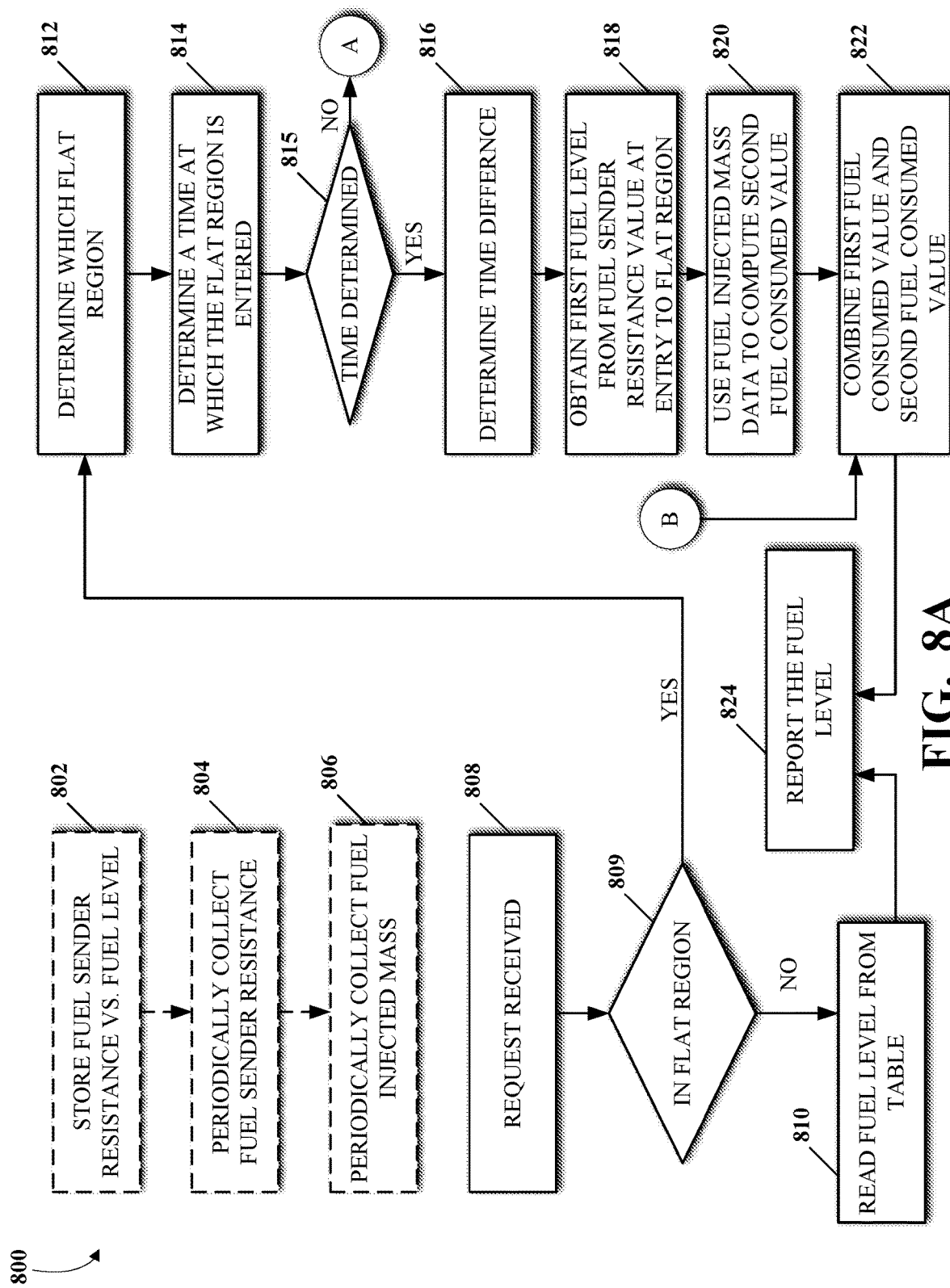
FIGS. 8A-8B are a flowchart of an example of a technique for obtaining a fuel level of a host vehicle at any time instant.
Figure 8B:
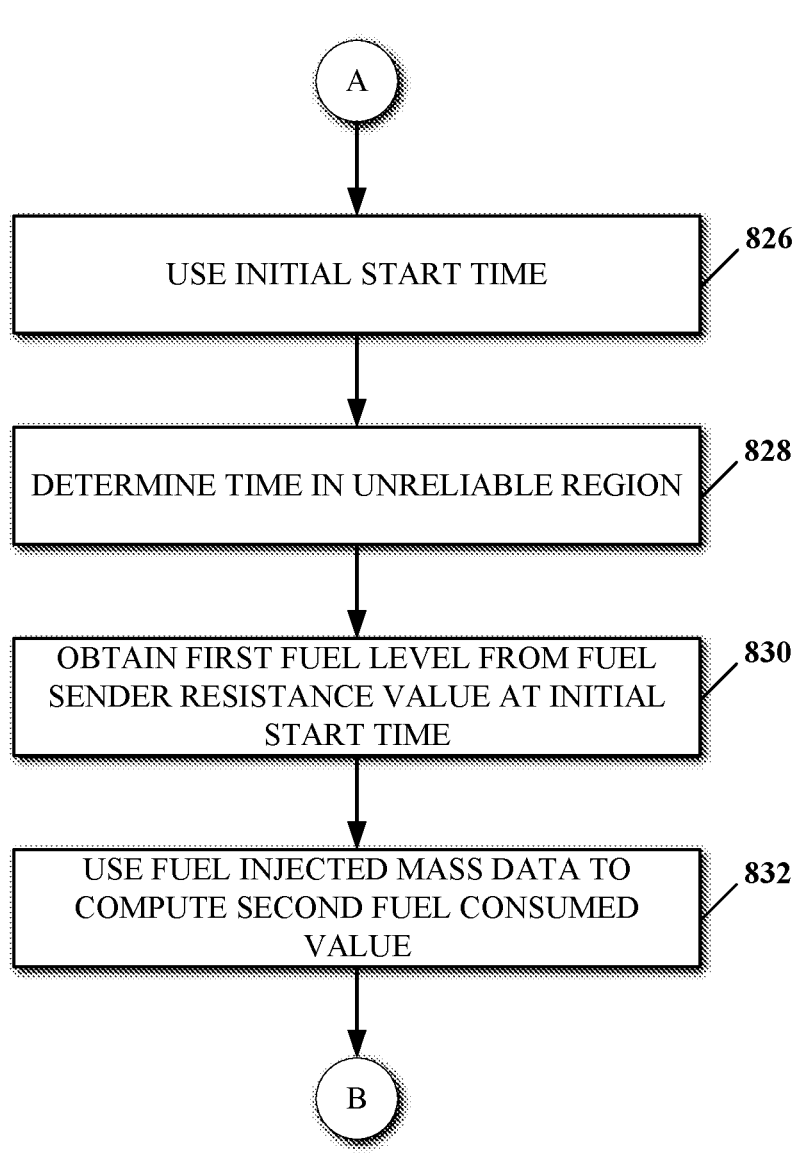

FIGS. 8A-8B are a flowchart of an example of a technique 800 for obtaining a fuel level of a host vehicle at any time instant. The technique 800 can be implemented by a fuel estimation module, which can be the fuel estimation module 502 of FIG. 5. The technique 800 can be implemented by a server, such as the cloud-based server 516 of FIG. 5, which is communicatively connected to the host vehicle. The technique 800 can be performed in response to receiving a request for obtaining the fuel level of the host vehicle (i.e., a fuel tank of the host vehicle) at any time instant.

At 802, lookup data may be stored such that the lookup data is accessible, directly or indirectly, by a component (e.g., module, program, etc.) executing the technique 800, as described with respect to 602 of FIG. 6. At 804, the technique 800 can periodically collect fuel sender resistance values, as described with respect to 604 of FIG. 6. At 806, the technique 800 can periodically collect fuel injected mass values (i.e., TIM values), as described with respect to 606 of FIG. 6. The technique 800 can perform the data collection at 804-806 as described with respect to 604-606 of FIG. 6

At 808, the technique 800 receives a request to obtain the amount of fuel in the fuel tank of the host vehicle at the time instant. The time instant can be a current time (e.g., the time of receiving the request). The time instant can be any time instant in the past.

At 809, the technique 800 determines whether an instant fuel sender resistance obtained at, or near, the time instant indicates that the instant fuel sender resistance is in a flat region (i.e., an unreliable region). In a case that the instant time is the current time, then the technique 800 can obtain the instant fuel sender resistance as described with respect to FIG. 1. In a case that the instant time is a time in the past, the technique 800 can look up, in the history data, the instant fuel sender resistance corresponding to the instant time. Using the lookup data, the technique 800 can determine whether the instant fuel sender resistance indicates that the fuel resender resistance is in a flat region.

If the fuel sender resistance does not indicate that the fuel resender resistance is in a flat region, the technique 800 proceeds to 810 to read the fuel level from the lookup data, where the lookup data can be as described with respect to FIG. 6. At 824, the technique 600 reports (e.g., outputs, displays, returns, etc.) the fuel level of the host vehicle.

If the fuel sender resistance indicates that the fuel resender resistance is in a flat region, the technique 800 proceeds to 812. At 812, the technique 800 determines the flat region (i.e., which flat region, if more than one are possible based on the benchmark data of the host vehicle). The flat region can be determined based on the instant fuel sender resistance value. As illustrated herein (such as with respect to FIGS. 2A-2B, 3, and 7), each flat region can be at a different, corresponding resistance value or range of resistance values.

At 814, the technique 800 determines a time (e.g., a timestamp) that the fuel sender resistance enters the flat region. History data, such as the history 512 or history data in the store 520, as the case may be, can be used to determine the time of entry into the flat region. As described above, first derivative data can be used. That is, the flat region can be determined to be entered when the derivative is equal, or is approximately equal to, zero. In another example, second derivative data can additionally be used, as described above. The technique 800 can also obtain the fuel sender resistance value at the time that the flat region is entered. In some examples, interpolation may be used. For example, if the data points collected for fuel sender resistance are spread out in time, interpolation may be used to obtain additional data points in between the two collected data points to better calculate the derivative(s) and determine the precise time of entry into the flat region.

At 815, the technique 800 determines whether a time that the fuel sender resistance enters the flat region is determined at 814. If a time that the fuel sender resistance enters the flat region is determined, the technique 800 proceeds to 815; otherwise the technique 800 proceeds to 826 of FIG. 8B.

At 816, the technique 800 determines a duration that the fuel sender resistance is in the flat region. The duration can be the time difference between the instant time and the time that the flat region is entered. At 818, the technique 800 obtains a first fuel level from fuel sender resistance value at the time of entry into the flat region. That is, using the lookup data, the technique 800 uses the fuel resistance level at the time of entry into the flat region to obtain the corresponding fuel level in the tank (i.e., the first fuel level). As can be appreciated, there can be multiple flat regions. As such, the technique 800 uses the fuel resistance level at the time of entry into the flat region combined with fuel consumed in the previous flat regions to obtain the corresponding fuel level in the tank.

At 820, the technique 800 obtains a second fuel consumed value in the flat region corresponding to the time spent in the flat region. In an example, and as described above, the technique 800 can integrate the fuel injected mass data (i.e., TIM values) from the history to obtain the second fuel consumed value in the flat region. In an example, the second fuel consumed value in the flat region can be further calibrated, such as based on other signals usable in fuel level estimation, such as torque data.

At 822, the technique 822 adds the second fuel consumed value in the flat region from the first fuel level from fuel sender resistance to obtain the fuel level of the host vehicle at time instant. The technique 800 adds the fuel level when the flat region is entered to the fuel consumed in the flat region until the request is received. The technique 800 then proceeds to 824 to report the fuel level of the host vehicle.

As eluded to above, there may be situations where a time of entry to a flat (e.g. unreliable) region may not be available. In an example, history data that includes a time of entry to the unreliable region may be reset (e.g., erased, etc.). In another example, the fuel tank of the host vehicle may be filled up and the host vehicle is driven for the day. Driving may resume the next day in, for example, the region 306 of FIG. 3. As such, there may not be an instance when the time derivative of fuel sender resistance reached zero. Other situations where a time of entry to a flat (e.g. unreliable) region may not be available are possible. As such, at 826, the technique 800 can use a starting time or earliest available time in the history as an initial start time.

At 828, the technique 800 determines a time in the unreliable region as the time difference between the initial time and the instant time. At 830, the technique 800 obtains the first fuel level from the fuel sender resistance value at the initial time, similar to 818. At 832, the technique 800 obtains a second fuel consumed value in the flat region corresponding to the time spent in the flat region, as described with respect to 820. The technique 800 then proceeds to 822.

Figure 9:
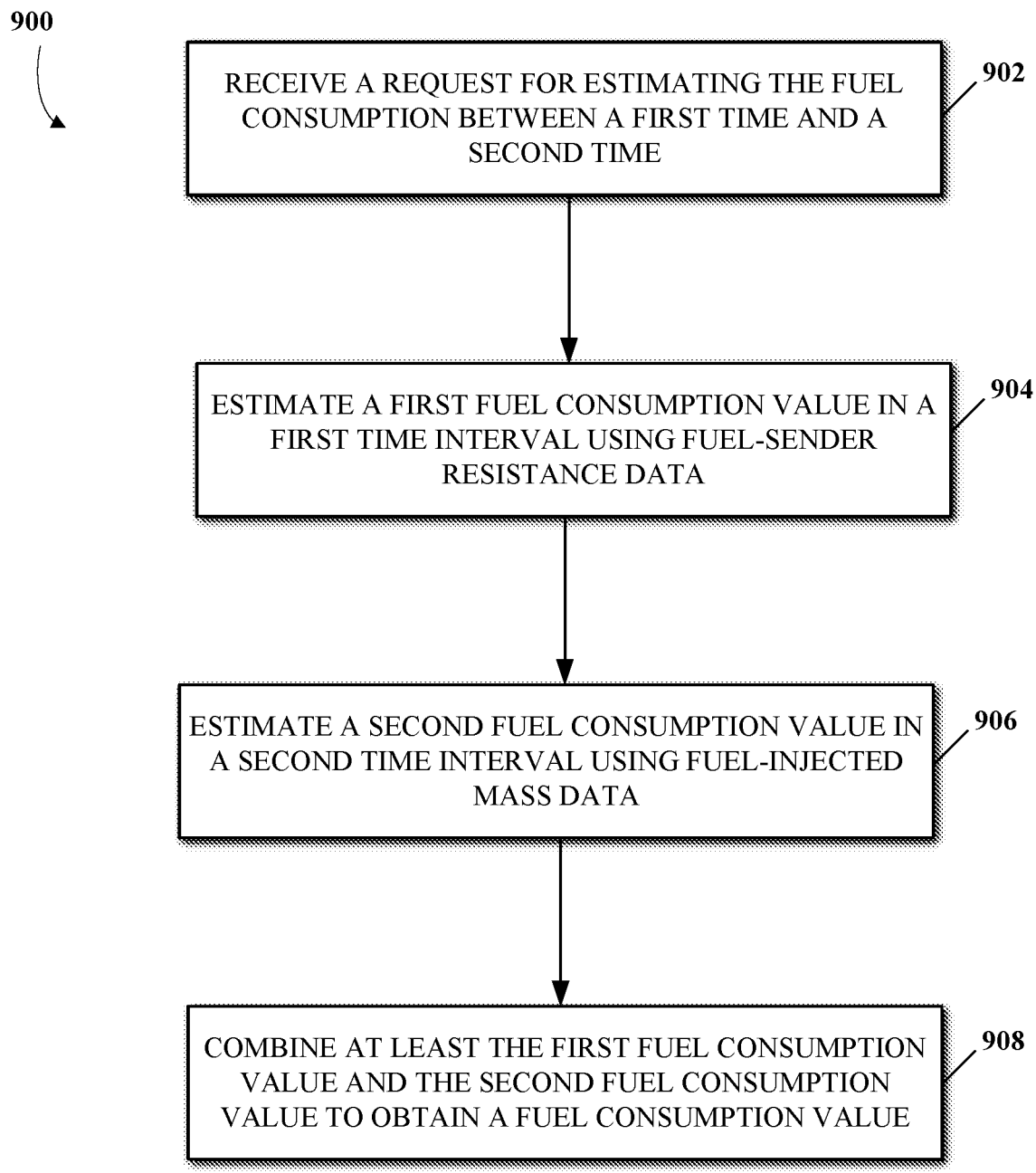
FIG. 9 is a flowchart of an example of a technique for estimating an amount of fuel consumed between a first time and a second time.

FIG. 9 is a flowchart of an example of a technique 900 for estimating an amount of fuel consumed between a first time and a second time. The technique 900 can be implemented, for example, as a software program that may be executed by a computing device, such as the cloud-based server 516 of FIG. 5. The technique 900 can be implemented by a fuel estimation module, which can be the fuel estimation module 502 of FIG. 5. The software program can include machine-readable instructions that may be stored in a memory (e.g., a non-transitory computer-readable storage medium), and that, when executed by a processor may cause the computing device to perform the technique 900. The technique 900 can be implemented using specialized hardware or firmware. Multiple processors, memories, or both, may be used.

At 902, the technique 900 receives a request for estimating the fuel consumption between a first time and a second time, as described above. At 904, the technique 900 estimates a first fuel consumption value in a first time interval using fuel-sender resistance data, which can include the fuel consumption in other/previous flat regions, as described above. At 906, the technique 900 estimates a second fuel consumption value in a second time interval using fuel-injected mass data, where the first time interval and the second time interval are consecutive, non-overlapping intervals, as described above. In an example, the second fuel consumption value is an estimate of fuel consumption in a case that a fuel gauge indicates that a fuel tank is empty. In an example, the second fuel consumption value is an estimate of fuel consumption in a case that a fuel gauge indicates that a fuel tank is full. In an example, the second fuel consumption value is an estimate of fuel consumption in a case that a fuel gauge indicates that a fuel tank is half full. At 908, the technique 900 combines at least the first fuel consumption value and the second fuel consumption value to obtain a fuel consumption value, as described above.

In an example, estimating the second fuel consumption value in the second time interval using the fuel-injected mass data can include adjusting the second fuel consumption value based on torque data. The torque data can be used to count a number of sudden accelerations. In an example, estimating the second fuel consumption value in the second time interval using the fuel-injected mass data can include adjusting the second fuel consumption value based on temperature data. In an example, the technique 900 can further include determining a start time of the second time interval using the fuel-sender resistance data.

In an example, estimating the second fuel consumption value in the second time interval using the fuel-injected mass data can include integrating at least some of fuel-injected mass data to obtain the second fuel consumption value, wherein the at least some of fuel-injected mass data are obtained in the second time interval.

Figure 10:
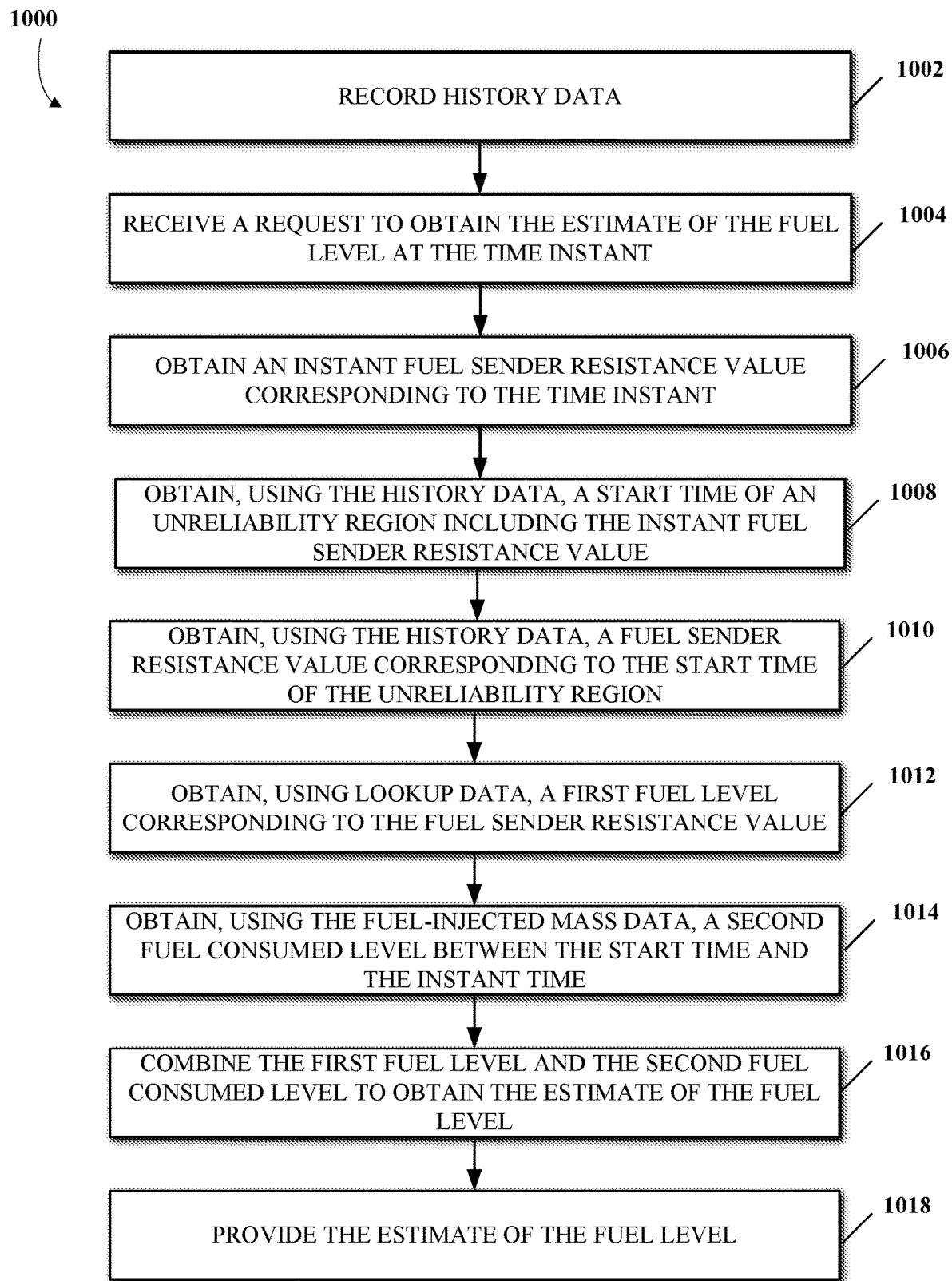
FIG. 10 is a flowchart of an example of a technique for obtaining a fuel level of a host vehicle at any time instant.

FIG. 10 is a flowchart of an example of a technique 1000 for obtaining a fuel level of a host vehicle at any time instant. The technique 1000 can be implemented, for example, as a software program that may be executed by a computing device, such as the cloud-based server 516 of FIG. 5. The technique 1000 can be implemented by a fuel estimation module, which can be the fuel estimation module 502 of FIG. 5. The software program can include machine-readable instructions that may be stored in a memory (e.g., a non-transitory computer-readable storage medium), and that, when executed by a processor may cause the computing device to perform the technique 1000. The technique 1000 can be implemented using specialized hardware or firmware. Multiple processors, memories, or both, may be used.

At 1002, the technique 1000 records history data, as described above. The history data can include fuel-injected mass data and first corresponding timestamps and fuel sender resistance data and second corresponding timestamps. At 1004, the technique 1000 receives a request to obtain the estimate of the fuel level at the time instant, as described above. At 1006, the technique 1000 obtains an instant fuel sender resistance value corresponding to the time instant, as described above. At 1008, the technique 1000 obtains, using the history data, a start time of an unreliable region including the instant fuel sender resistance value, as described above. In an example, the start time of the unreliable region can be an initial time of recording, in the history data, the fuel-injected mass data. At 1010, the technique 1000 obtains, using the history data, a fuel sender resistance value corresponding to the start time of the unreliable region, as described above. At 1012, the technique 1000 obtains, using lookup data, a first fuel level corresponding to the fuel sender resistance value, as described above. At 1014, the technique 1000 obtains, using the fuel-injected mass data, a second fuel consumed level between the start time and the instant time, as described above. At 1016, the technique 1000 combines the first fuel level and the second fuel consumed level to obtain the estimate of the fuel level, as described above. At 1018, the technique 1000 provides the estimate of the fuel level.

In an example, the technique 1000 can include, in response to the instant fuel sender resistance value being in a reliable region, providing the fuel level based on the instant fuel sender resistance value. In an example, obtaining, using the fuel-injected mass data, the second fuel consumed level between the start time and the time instant can include integrating at least some of fuel-injected mass data to obtain the second fuel consumed level. Obtaining, using the history data, the start time of the unreliable region including the instant fuel sender resistance value can include using first derivatives of the fuel-injected mass data to determine of the start time of the unreliable region. In an example, second derivatives of the fuel-injected mass data can further be used to determine the start time of the unreliable region.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. Instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the terminology "example", "embodiment", "implementation", "aspect", "feature", or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "determine" and "identify", or any variations thereof, includes selecting, ascertaining, computing, looking up, receiving, determining, establishing, obtaining, or otherwise identifying or determining in any manner whatsoever using one or more of the devices shown and described herein.

As used herein, the terminology "or" is intended to mean an inclusive "or" rather than an exclusive "or" unless specified otherwise, or clear from context. In addition, the articles "a" and "an" as used in this application and the appended claims should generally be construed to mean "one or more" unless specified otherwise or clear from context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

The above-described aspects, examples, and implementations have been described in order to allow easy understanding of the disclosure are not limiting. On the contrary, the disclosure covers various modifications and equivalent arrangements included within the scope of the appended claims, which scope is to be accorded the broadest interpretation so as to encompass all such modifications and equivalent structure as is permitted under the law.

What is claimed is:

1. A method for estimating fuel consumptions of a vehicle, comprising:
   estimating a first fuel consumption value in a first time interval using fuel-sender resistance data;
   estimating a second fuel consumption value in a second time interval using fuel-injected mass data;
   combining at least the first fuel consumption value and the second fuel consumption value to obtain a fuel consumption value; and
   outputting the fuel consumption value.

2. The method of claim 1, wherein the first time interval and the second time interval are consecutive, non-overlapping intervals of a same driving session.

3. The method of claim 1, further comprising:
   calibrating the fuel-sender resistance data based on a benchmark obtained from a liter-by-liter fuel fill test.

4. The method of claim 1, further comprising:
   obtaining the fuel-injected mass data from a fuel injection system of the vehicle in real-time.

5. The method of claim 1, wherein estimating the second fuel consumption value in the second time interval using the fuel-injected mass data comprises:
   adjusting the second fuel consumption value based on torque data.

6. The method of claim 1, wherein estimating the first fuel consumption value in the first time interval using the fuel-sender resistance data comprises:
   in response to receiving an ignition start signal, determining whether to apply a cold-start calibration factor based on an engine temperature of the vehicle.

7. The method of claim 1, further comprising:
   analyzing driving behavior data to identify instances of sudden accelerations; and
   adjusting, prior to the outputting, the fuel consumption value to account for an increased fuel usage associated with the sudden accelerations.

8. A vehicle, comprising:
   a fuel tank;
   a fuel sender; and
   a processor configured to obtain an estimate of a fuel level at a time instant in the fuel tank by instructions to:
   identify an unreliable instant fuel sender resistance value;
   determine, using history data, a start time of an unreliable period associated with the unreliable instant fuel sender resistance value;
   retrieve a reliable fuel sender resistance value from the history data corresponding to the start time of the unreliable period;
   calculate a first fuel level from the reliable fuel sender resistance value using lookup data;
   compute a second fuel consumed level from fuel-injected mass data during the unreliable period; and
   combine the first fuel level with the second fuel consumed level to provide an estimated current fuel level in the fuel tank.

9. The vehicle of claim 8, wherein the processor is further configured to:
   use first derivatives of the fuel-injected mass data to determine the start time of the unreliable period.

10. The vehicle of claim 8, wherein the processor is further configured to:
    use second derivatives of the fuel-injected mass data to determine the start time of the unreliable period.

11. The vehicle of claim 8, wherein the processor is further configured to:
    adjust the estimated current fuel level based on torque data, wherein higher torque is correlated with increased fuel consumption.

12. The vehicle of claim 8, wherein the processor is further configured to:
    identify driving events associated with higher fuel consumption; and
    adjusting the estimated current fuel level to account for the higher fuel consumption.

13. The vehicle of claim 12, wherein the driving events correspond to sudden accelerations.

14. The vehicle of claim 8, wherein the processor is further configured to:
    adjusting the estimated current fuel level based on an identification of a cold start accounting for increased fuel consumption experienced during an initial engine start in low-temperature conditions.

15. The vehicle of claim 14, wherein the processor is further configured to:
    detect a cold-start condition based on an engine coolant temperature being less than a predetermined cold start temperature.

16. A non-transitory computer-readable storage medium, comprising instructions executable by a processor to perform operations for estimating fuel consumptions of a vehicle, the operations comprising:
    estimating a first fuel consumption value in a first time interval using fuel-sender resistance data;
    estimating a second fuel consumption value in a second time interval using fuel-injected mass data;
    combining at least the first fuel consumption value and the second fuel consumption value to obtain a fuel consumption value; and
    outputting the fuel consumption value.

17. The non-transitory computer-readable storage medium of claim 16, further comprising:
    obtaining the fuel-injected mass data from a fuel injection system of the vehicle in real-time.

18. The non-transitory computer-readable storage medium of claim 16, wherein estimating the second fuel consumption value in the second time interval using fuel-injected mass data comprises:
    adjusting the second fuel consumption value based on torque data.

19. The non-transitory computer-readable storage medium of claim 16, wherein estimating the first fuel consumption value in a first time interval using the fuel-sender resistance data comprises:
  in response to receiving an ignition start signal, determining whether to apply a cold-start calibration factor based on an engine temperature of the vehicle.

20. The non-transitory computer-readable storage medium of claim 16, wherein the operations further comprise:
  analyzing driving behavior data to identify instances of sudden accelerations; and
  adjusting, prior to the outputting, the fuel consumption value to account for an increased fuel usage associated with the sudden accelerations.

\* \* \* \* \*